(12) United States Patent
Fischer

(10) Patent No.: US 7,746,231 B2
(45) Date of Patent: Jun. 29, 2010

(54) CIRCUIT ARRANGEMENT FOR LOAD REGULATION IN THE RECEIVE PATH OF A TRANSPONDER

(75) Inventor: Martin Fischer, Pfedelbach (DE)

(73) Assignee: Atmel Automotive GmbH, Heilbronn (DE)

( * ) Notice: Subject to any disclaimer, the term of this patent is extended or adjusted under 35 U.S.C. 154(b) by 138 days.

(21) Appl. No.: 11/944,249

(22) Filed: Nov. 21, 2007

(65) Prior Publication Data

US 2008/0068172 A1 Mar. 20, 2008

Related U.S. Application Data

(62) Division of application No. 11/081,565, filed on Mar. 17, 2005, now Pat. No. 7,317,307.

(30) Foreign Application Priority Data

Mar. 17, 2004 (DE) ........................ 10 2004 013 175

(51) Int. Cl.
 *G08B 13/14* (2006.01)
(52) U.S. Cl. .................. 340/572.1; 340/572.7
(58) Field of Classification Search .............. 340/572.1, 340/572.2, 572.4, 572.7, 636.12, 636.13, 340/636.15, 657, 659, 660, 661, 662, 10.1, 340/10.3, 10.34; 323/268, 270, 299, 303, 323/312, 315; 327/538–541, 543; 455/270, 455/280, 292, 334, 338, 343.1
See application file for complete search history.

(56) References Cited

U.S. PATENT DOCUMENTS

| | | | |
|---|---|---|---|
| 5,153,500 A | 10/1992 | Yamamoto et al. | |
| 5,302,888 A | 4/1994 | Hellums et al. | |
| 5,345,196 A | 9/1994 | Mahant-Shetti et al. | |
| 5,625,648 A | 4/1997 | Hedberg | |
| 5,889,489 A * | 3/1999 | Friedman et al. | ............... 342/51 |
| 6,169,456 B1 | 1/2001 | Pauls | |
| 6,963,188 B2 | 11/2005 | Wich | |
| 7,173,405 B2 | 2/2007 | Bo et al. | |
| 2003/0104848 A1 | 6/2003 | Brideglall | |

FOREIGN PATENT DOCUMENTS

JP 2000181558 6/2000

(Continued)

OTHER PUBLICATIONS

Möschwitzer, Albrecht: "Halbleiterelektronik", Dr. Alfred Hüthig Publishing, Heidelberg Germany, p. 385, paragraph 5.5.1.2.

*Primary Examiner*—Toan N Pham
*Assistant Examiner*—Kerri McNally
(74) *Attorney, Agent, or Firm*—Muncy, Geissler, Olds & Lowe, PLLC

(57) ABSTRACT

A circuit arrangement for load regulation of circuit components is arranged in a receive path of a transponder, having an input path through which a first voltage signal can be tapped, having a voltage sensor arranged in the input path for measuring the first voltage signal, having at least one output path through which a discharge current signal can be tapped, having at least one controllable auxiliary current source arranged between the input path and the output path to provide the at least one discharge current signal, the control side of the auxiliary current source being connected to an output of the voltage sensor such that the value of the discharge current signal increases exponentially with increasing voltage of the first voltage signal.

15 Claims, 3 Drawing Sheets

FOREIGN PATENT DOCUMENTS

| | | |
|---|---|---|
| JP | 2003256056 | 9/2003 |
| WO | WO 2004013806 | 2/2004 |
| WO | WO 2004013807 | 2/2004 |
| WO | WO 2004015625 | 2/2004 |

* cited by examiner

CIRCUIT ARRANGEMENT FOR LOAD REGULATION IN THE RECEIVE PATH OF A TRANSPONDER

This nonprovisional application is a divisional of application Ser. No. 11/081,565, filed Mar. 17, 2005 now U.S. Pat No. 7,317,307 which claims priority to German Patent Application No. DE 102004013175.9, which was filed in Germany on Mar. 17, 2004, and which are all herein incorporated by reference.

BACKGROUND OF THE INVENTION

1. Field of the Invention

The present invention relates to a circuit arrangement for load regulation of circuit components arranged in a receive path of a transponder, a detector circuit for signal detection, in particular for passive and/or semi-passive transponders, a transponder, and a method for operating the transponder. The invention resides in the field of transponder technology and more particularly in the field of contactless communication for the purposes of identification.

2. Description of the Background Art

In passive and semi-passive transponders, an electromagnetic signal sent out by a base station is received and demodulated by the transponder. Passive transponders have no energy supply of their own, so the energy required in the transponder for demodulation and decoding of the received electromagnetic signal must be extracted from this electromagnetic signal itself. Energy can be extracted from an electromagnetic wave either inductively by an antenna coil, or magnetically using a dipole antenna. For general background on this technology, known as RFID technology, please refer to the "RFID Handbuch" by Klaus Finkenzeller, third revised edition, 2002.

In passive 125 KHz systems currently in use, the extraction of energy in the electromagnetic near field is implemented through inductive coupling. The energetic range achieved in this way lies in the range of a few centimeters to approximately 0.5 m. In order to achieve a greater range and a higher data transmission rate for the data transmission, carrier frequencies in the UHF frequency band or microwaves are increasingly used in the area of RFID technology. Dipole antennas are typically used for coupling the energy and the data signal at such high carrier signal frequencies. Ranges of up to a few meters can be achieved with passive transponders using such dipole antennas.

A goal in present and future RFID systems is to achieve the greatest possible ranges at the highest possible data transmission rates with passive transponders. A long range can be achieved, in particular, by increasing the transmit power of the base station. Since RFID systems generate and radiate electromagnetic waves, and thus can be considered radio installations, an important boundary condition of, for example, national and European HF regulations is that these RFID systems must not interfere with or impair other radio services. The required consideration of other radio services severely limits the selection of operating frequency for RFID systems as well as their transmit power. On the basis of these national and European HF regulations, the maximum transmit power is sharply limited with respect to the frequency in question.

FIG. 1 shows a schematic block diagram of a known detector circuit 1 that is arranged in a receive path of a transponder. The detector circuit 1 contains an input-side dipole antenna 2 for receiving a transmitted high-frequency carrier signal XHF. As a function of the field strength of the carrier signal XHF, a high frequency signal V1 is generated by the dipole antenna 2 and is fed to a rectifier 3 which follows the dipole antenna 2. A signal capacitor 4 is arranged between the outputs of the rectifier 3. A voltage U1 that is derived from the received and rectified signal V1, and which thus is a measure of the field strength of the high frequency carrier signal XHF, drops across the signal capacitor 4. This signal voltage U1 firstly contains the data which is present as modulation of the high frequency carrier XHF. In addition, the signal voltage U1 also contains the energy for the transponder's energy supply. An analysis circuit 5 for analyzing the signal U1, and thus extracting the data, is also provided.

In most RFID systems, data transmission takes place with the use of pulse-interval modulated signals. In such systems, digital data are exchanged between the base station and the transponder by the amplitude-modulated carrier wave XHF. The individual data bits are produced through pulse-interval modulation of the carrier signal XHF in that the transmitter in the base station switches an electromagnetic field on for specific time intervals and then off again. When the transponder receives the carrier signal modulated in this way, a signal voltage U1 derived from the field strength of the carrier signal XHF is generated on the input side of the transponder; this signal voltage has voltage dips at the points where the electromagnetic field was switched off on the transmitter side. Such a voltage dip is also referred to hereinafter as a "notch." The data now lie in the time interval between two such voltage dips. The length of such a time interval thus determines the value of the corresponding data bit. For example, provision can be made here that a first time interval corresponds to a logic "0" and a second time interval that is longer than the first time interval corresponds to a logic "1". The field gap in which the base station transmitter is switched off, and therefore transmits no electromagnetic carrier signal, thus in a certain sense represents a separator between two successive data bits.

Increasingly stringent security requirements in identification necessitate ever higher data transmission rates in modern RFID systems in order to keep the time periods during which an identification takes place as short as possible, in order to thereby transmit a large number of information packets modulated on a carrier wave in ever shorter periods of time. Consequently, ever increasing ranges for data communication are required in RFID systems operating at low power levels, regardless of the limited transmit power. In order to satisfy this requirement, the transponder must extract adequate energy from the field of the transmitted carrier signal XHF even with very weak electrical and/or magnetic fields. However, this is only possible when the rectifier 3 of the transponder has the highest possible efficiency. Moreover, it must also be possible to detect and reproduce even very small signal voltages U1.

Modern transponders must therefore be capable of operating both in a near field where a large electric field of the carrier signal is present, and in a far field where the electric field is sometimes very strongly attenuated. However, this operation of a transponder in both the near field and far field gives rise to the following problem, which is described on the basis of FIGS. 2a and 2b:

FIGS. 2a and 2b show the behavior of the envelope curve of the transmitted high frequency carrier signal XHF and the behavior of the signal voltage U1, which must reproduce this envelope curve as well as possible. FIG. 2(a) shows the curve behavior in a transponder operated in the far field, and FIG. 2(b) shows the curve behavior in a transponder operated in the near field. In each case, a represents the notch of the envelope curve and of the signal voltage; b designates the envelope curve of the high frequency carrier signal XHF, and c designates the signal voltage U1 reproducing this carrier signal. The solid line labeled c represents the characteristic curve of the signal voltage in the case of a low discharge current, and the dashed line labeled c represents the corresponding signal voltage characteristic at a high discharge current. The following considerations apply: the signal voltage c should reproduce the behavior of the carrier signal and its envelope curve b as well as possible, with it being important here that the voltage dips a in the signal voltage c functioning as separators are also very pronounced.

The envelope curve b of the carrier signal XHF has, on the one hand, a low amplitude for a transponder operated in the far field, and on the other hand forms an adequately wide notch a (FIG. 2(a)). In order to still be able to detect the corresponding voltage dips a with such low voltage amplitudes of the signal voltage U1 here, the detector 1 of the transponder typically has a short time constant so as to recognize very small notches for what they are. Thus, to implement a short time constant, a capacitor 4 with the smallest possible capacitance is used. As a result, the discharge current provided by the capacitor 4 is likewise very small. In the far field this time constant is also adequate to reproduce the envelope curve b of the carrier signal XHF very well. A larger discharge current would also have had the disadvantage that the transponder required much more power, which on the whole would lead to a reduction in the range for the data communication.

However, reproducing the envelope curve b of the carrier signal for a transponder operated in the near field is problematic (FIG. 2(b)). In the near field, the amplitude of the envelope curve b is very much greater, with the result that the edges of the envelope curve b are very much sharper in the region of the individual notches a. A much higher discharge current would now be needed to produce the signal voltage c (see dashed characteristic curve) in order to follow the rapid change in the envelope curve. Due to the small capacitor 4 that is present, however, the detector can provide only low discharge currents. This has the immediate result that the voltage dips c are not reproduced at all or are only partially reproduced. This results from the fact that the signal voltage c reproducing the envelope curve b no longer definitely drops to zero because the small capacitor provides only low discharge currents, but these cannot reproduce the rapidly changing carrier signal in the short time required, however. Thus, in the case of a transponder operated in the near field, the voltage dips are no longer recognizable for what they are. This leads to errors in the detection of the corresponding bit information, with the result that a higher bit error rate (BER=Bit Error Rate) must be expected in this constellation.

To avoid this, many RFID systems that are to be operated in the far field of an electromagnetic signal as well as the near field use very high discharge currents for the signal detector regardless of whether the transponder is located in the near field or the far field at the time. However, this has the grave disadvantage that it sharply limits the range of data communication, since a high discharge current is used in the far field as well.

In order to avoid this situation, most existing systems are designed so as to provide the best possible compromise between operation in the far field and operation in the near field. However, this means that the disadvantages such as shorter range, higher bit error rate, and higher energy consumption must also be accepted.

Understandably, there is a desire to avoid this situation.

SUMMARY OF THE INVENTION

It is therefore an object of the present invention to provide a transponder that can be operated in a far field as well as in a near field with the least possible degradation in the range of data communication and/or with the lowest possible bit error rate.

Accordingly, in an example embodiment, provision is made for a circuit arrangement for load regulation of circuit components arranged in a receive path of a transponder, having an input path through which a first voltage signal can be tapped, having a voltage sensor arranged in the input path for measuring the first voltage signal, having at least one output path through which a discharge current signal can be tapped, having at least one controllable auxiliary current source arranged between the input path and the output path to provide the at least one discharge current signal. The control side of the auxiliary current source being connected to an output of the voltage sensor such that the value of the discharge current signal increases exponentially with increasing voltage of the first voltage signal.

In another example embodiment, a detector circuit, particularly for a receive path of a passive and/or semi-passive transponder, has an input for receiving a signal derived from a high frequency electromagnetic carrier signal, has a circuit component for detecting and analyzing a signal voltage, which circuit has, following the input, a signal capacitor across which the signal voltage dependent on the field strength of the carrier signal drops, and has an analysis circuit following the signal capacitor for analyzing the signal voltage. A circuit arrangement for load regulation can be provided that draws a discharge current from the circuit component in the event that the magnitude of the signal voltage exceeds a predetermined threshold.

In accordance with another example embodiment, a transponder, in particular a passive and/or a semi-passive transponder, has, arranged between a first and second input of the transponder, an antenna for receiving a high frequency electromagnetic carrier signal for supplying energy to the transponder and for data communication with a transmitting station, and has a receive path following the antenna in which is arranged a demodulator circuit for demodulating a received modulated signal derived from the carrier signal. The demodulator circuit has a detector circuit according to the invention.

In a further example embodiment, a method for operating a transponder is provided, having a first operating mode in which the transponder is operated in a near field of a high frequency electromagnetic carrier signal, having a second operating mode in which the transponder is operated in a far field of the high frequency electromagnetic carrier signal. The discharge current is increased by the circuit component and/or by the analysis circuit in the first operating mode as the signal voltage increases, in particular with the use of a circuit arrangement according to the invention.

According to a further example embodiment, the present invention provides an additional discharge current for a transponder that is operated in the near field. The current is used expressly for discharge processes within the detector in near-field operation. In this way, the appropriate capacitances can be charged and discharged very rapidly using the discharge current. The signal voltage, which is a measure of the behavior of the field of the carrier signal, then reproduces the carrier signal very well, especially in the vicinity of a notch, in the near field as well as the far field of the carrier signal. In this way, the notches that are necessary for demodulation and decoding of the data bits can be detected very well in the near field as well as in the far field.

Only a voltage sensor and at least one discharge current source are required for this purpose. The voltage sensor measures a voltage signal as a measure of the field of the high frequency carrier signal. The auxiliary current source produces a discharge current as a function of this voltage signal.

Through suitable design of the auxiliary current source, a discharge current can be produced only in the case of a transponder operated in the near-field region, wherein the recognition that the near-field region is present can be derived from the measured voltage signal itself.

This allows the transponder or, respectively, a detector circuit for such a transponder, to be designed for an optimal range. Nevertheless, despite the optimized range, the transponder also has a minimum bit error rate for operation in the near field.

Through the use of simple diodes and MOS transistors for the voltage sensor and the auxiliary current source, the inventive circuit arrangement for load regulation can be implemented in a very simple and space-saving manner with regard to circuit design.

Typically, the auxiliary current source is embodied as a current sink for providing a discharge current for the signal capacitor or other circuit components. The charging of the circuit capacitor is advantageously performed dynamically by the electromagnetic field itself or by the received signal derived therefrom.

In an example embodiment, the voltage sensor has at least one diode that is wired in the forward direction relative to an input connection at which the voltage signal can be tapped. The diodes of the voltage sensor are advantageously embodied as transistor diodes. In addition, at least one diode of the voltage sensor is composed of a diode of the current mirror circuit and is wired in series with the other diode of the voltage sensor.

The current sink can also have a current mirror circuit. The current mirror circuit is arranged on the input side in the input path and is connected the output side with the output path of the circuit for load current regulation and with an input of the voltage sensor In a further embodiment, the transistors of the current sink and of the voltage sensor can be embodied as MOS transistors, especially as CMOS transistors. At least some of these MOS transistors can be embodied as MOS diodes. In particular, MOSFETs embodied as transistor diodes have low temperature dependence as compared to conventional PN diodes.

At least one of the diodes of the voltage sensor and/or at least one of the diodes of the current sink can be implemented as pn diodes, as MOS diodes, or as Schottky diodes.

The voltage sensor can have three diodes connected in series to one another. This number provides an optimum diode characteristic curve, especially for a defined design of the circuit arrangement for a given near field or far field.

The current characteristic curve for the discharge current provided by the current sink can be adjusted in a very simple manner by W/L ratios of the transistors in the current mirror circuit. In this way, the circuit arrangement can be adjusted for the desired range, and thus the desired application of the transponder, in a very elegant manner through suitable choice of area ratios.

The current sink advantageously produces a discharge current that increases more or less exponentially with increasing voltage of the measured voltage signal. The current sink thus produces a discharge current that has approximately the characteristic curve of a diode. During a transition from far field to the near field, the discharge current provided by the current sink rises successively. In this way, it is possible to ensure a very gentle, continuous transition between operation in the far and near fields, since no abrupt transitions are present between the two. The avoidance of abrupt transitions thus makes it possible to avoid undesirable distortions in the reproduced signal voltage. Thus, lower bit error rates can also be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
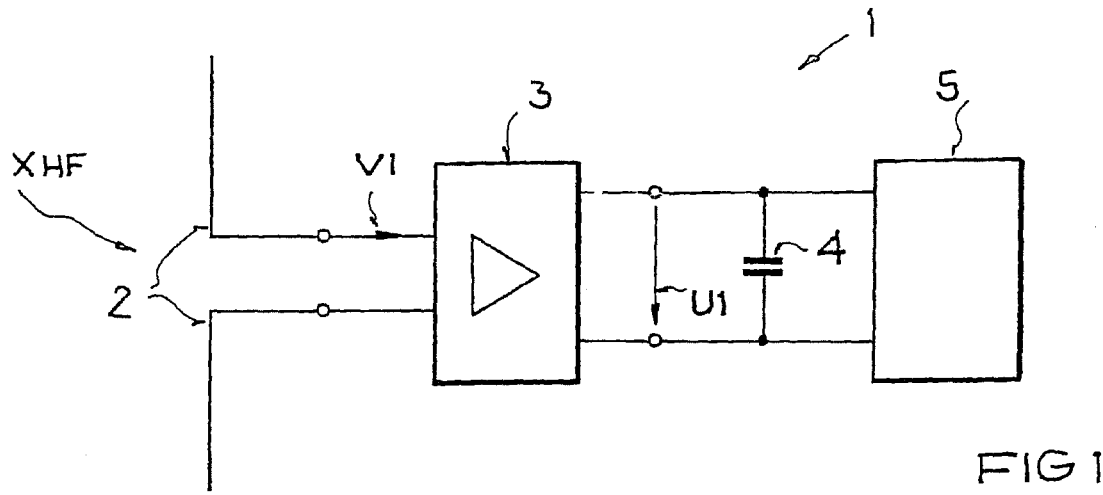
FIG. 1 is a schematic block diagram of a conventional detector circuit for a transponder.
Figure 2A:
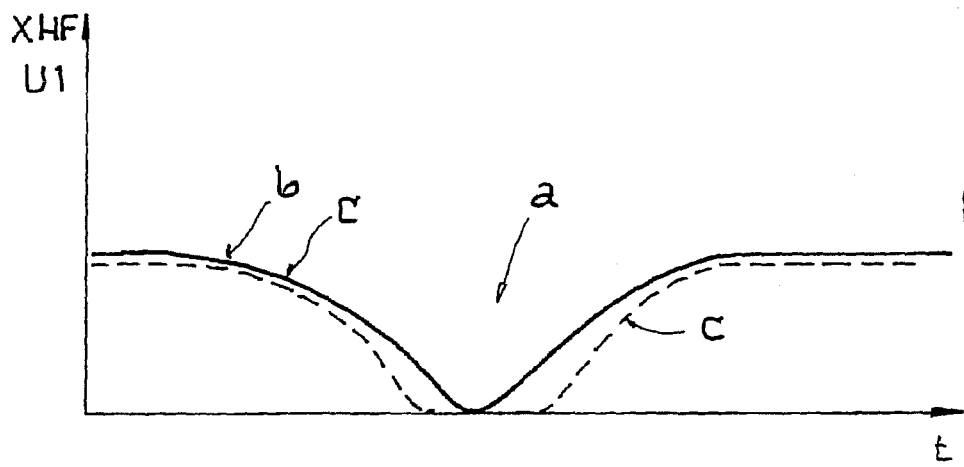
FIGS. 2a & 2b show the behavior of the envelope curve of the high frequency carrier signal and the signal voltage derived therefrom in the case of a transponder operated in a far field (a) and in a near field (b)
Figure 2B:
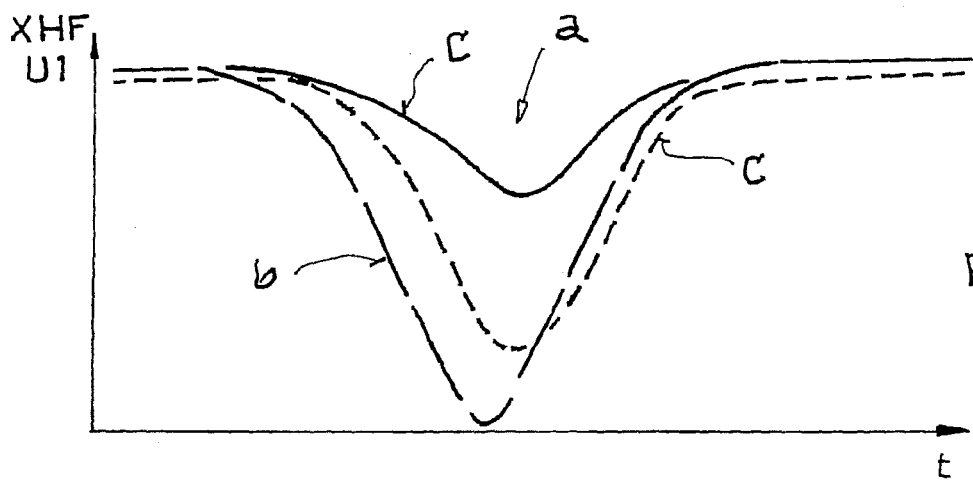

In the drawings, like or functionally like elements and signals are identified with the same reference labels, unless otherwise specified.

Figure 3:
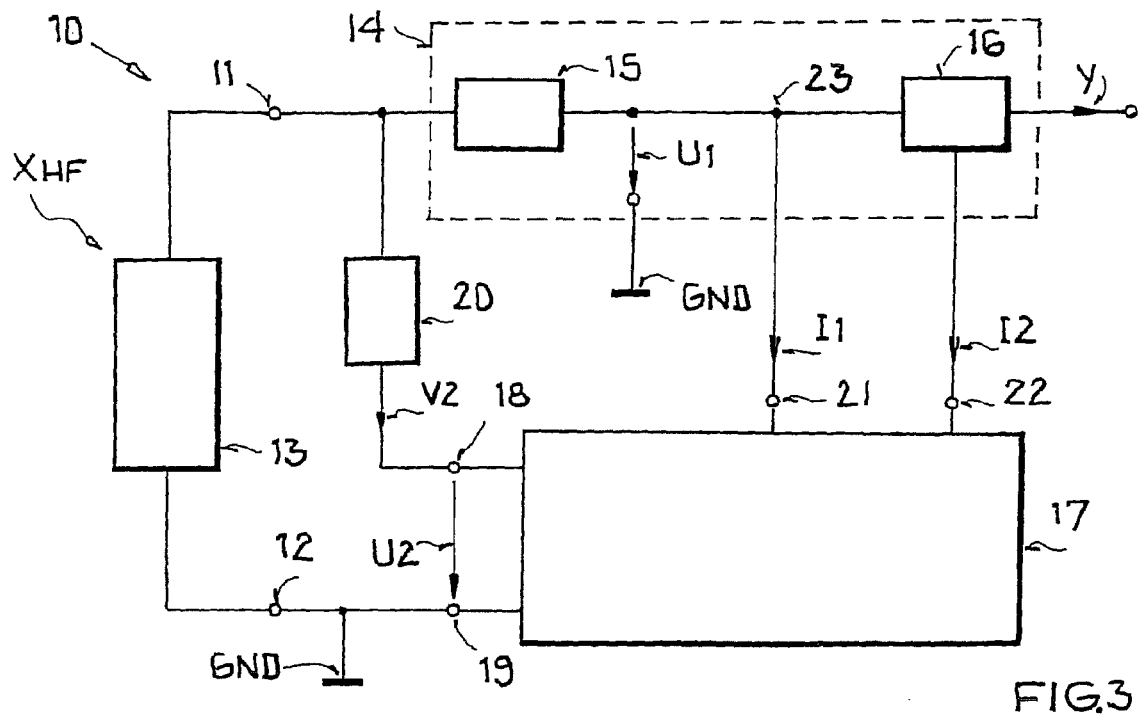
FIG. 3 is a schematic block diagram of a circuit arrangement according to an embodiment of the present invention for load regulation in the receive path of a transponder.

FIG. 3 shows a schematic block diagram of a detector circuit 10, according to an embodiment of the present application, for load regulation in the receive path 24 of a transponder that is only shown in part. The transponder has input connections 11, 12. The present example embodiment assumes that the reference potential GND is applied to the input connection 12. Arranged between the input connections 11, 12 is an antenna 13, which serves to receive a signal V1 derived from a transmitted high frequency carrier signal XHF. The antenna 13 can be embodied as a dipole antenna for receiving a magnetically coupled carrier signal XHF or as a coil antenna for receiving an inductively coupled carrier signal XHF.

The detector circuit 10 can be arranged in the receive path 24 of the transponder. The detector circuit 10 can also have an analog circuit component 14 for detecting and analyzing the signal voltage U1. Hence, the signal V1 derived from the high frequency carrier signal XHF is supplied to the input side of the circuit component 14.

In the present example embodiment, the circuit component 14 contains an RSSI amplifier 15 (RSSI=Received Signal Strength Indicator), which is connected on the input side to the input connection 11. The RSSI amplifier 15 can have a rectifier and a signal capacitor (neither of these are shown). At its output side, the RSSI amplifier 15 provides the analog signal voltage U1. In this context, the analog signal voltage U1 is derived from the signal V1, and thus from the high frequency carrier signal XHF, and ideally has clearly recognizable voltage dips for coding the data.

The RSSI amplifier 15 is followed by an analysis circuit 16, which consequently is supplied with the analog signal voltage U1. The analysis circuit 16 analyzes the data contained in the analog signal voltage U1 and produces, on the output side, a digital signal Y, in which the corresponding data bits of the transmitted carrier signal XHF are present in digitally coded form.

In accordance with the invention, a circuit arrangement 17 for load current regulation is provided as well. The circuit arrangement 17 has two inputs 18, 19, which can be connected to the input connections 11, 12. In addition, a rectifier circuit 20 is wired between the input connection 11 and the connection 18. Thus the signal V2 derived from the high frequency carrier signal XHF or the signal V1 is supplied to the circuit arrangement 17 in rectified and, if necessary, filtered and amplified form, through the input 18.

It is assumed that the RSSI amplifier 15 has the shortest possible time constant and thus the lowest possible capacitance. It is further assumed that the rectifier circuit 20 has the longest possible time constant, and thus the highest possible capacitance. The rectifier circuit 20 typically can have a multistage, in particular 5-stage, amplifier.

The circuit arrangement 17 for load current regulation additionally has two outputs 21, 22. The first output 21 is connected to a node 23 between the RSSI amplifier 15 and the analysis circuit 16. The second output 22 is connected to a connection of the analysis circuit 16. A discharge current I1, I2 can be drawn from or supplied to the circuit component 14 through the connections 21, 22 respectively. This discharge current I1, I2 can be used to more rapidly charge the corresponding capacitances in the RSSI amplifier 15 or in the analysis circuit 16.

Figure 4:
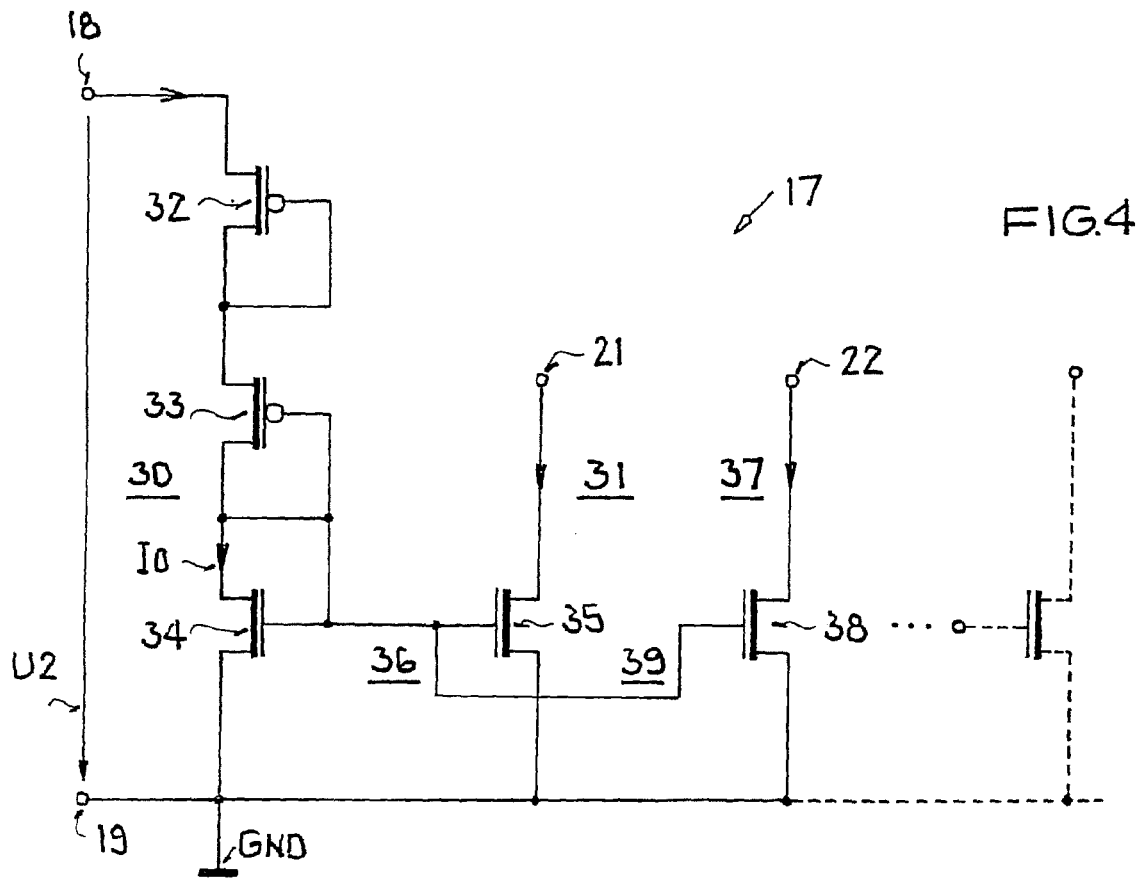
FIG. 4 is a circuit design of a circuit arrangement for load current regulation represented in a schematic diagram, according to an embodiment of the present invention.

The precise circuit design of the inventive circuit 17 for load regulation, as well as its function within the detector circuit 10, is described in detail below on the basis of FIGS. 4 and 5. FIG. 4 uses a schematic circuit diagram to show the circuit design of the inventive circuit arrangement for load current regulation.

The circuit arrangement 17 has an input path 30 and an output path 31. The input path 30 is arranged between the connections 18, 19. The output path 31 is connected to the output connection 21 and also to the connection 19 for the reference potential GND. Provided in the load path 30 are three transistors 32-34, which are arranged in series with one another by way of their controlled paths. Another transistor 35 is arranged in the load path 31. Each of the transistors 34, 35 connected to the reference potential GND in the input path 30 and output path 31 form a current mirror 36, wherein the input-side transistor 34 forms the current mirror diode. The two other transistors 32, 33 in the input path 30 are embodied as transistor diodes and are wired in the forward direction with respect to the input connection 18.

In addition or alternatively, a second output path 37 can be provided, which is connected to the connection 22. Arranged in this output path 37 is an MOS transistor 38, which is connected on the control side to the control connection of the transistor 34, and which thus forms, together with the transistor 34, another current mirror 39.

All transistors 32-35 can be embodied as MOSFET transistors, wherein the transistors 34, 35, 38 of the current mirror 36, 39 can be embodied as NMOS transistors and the transistor diodes 32, 33 can be embodied as PMOS transistors.

The two PMOS transistors 32, 33, and the NMOS transistor 34 that is connected as a transistor diode, together form a current sensor. The current mirror 36, together with the two NMOS transistors 34, 35, form a first current sink for producing the discharge current I1, and the current mirror 39 with the two NMOS transistors 34, 38 form a second current sink for producing the discharge current I2. The value of a given discharge current I1, I2 can be set in a targeted manner by a W/L ratio of the current mirror transistors 34, 35 or 34, 38, respectively. These discharge currents I1, I2 are each functions of a current I0 flowing at the input side through the input mirror 36, 39, taking the area ratios into account. This current I0 is in turn a function of the voltage signal V2 coupled to the input connection 18, or the voltage U2=V2−GND dropping between the input connections 18, 19. The voltage U2 is, moreover, also a measure of the signal voltage U1, which drops across the signal capacitor and which is to be reproduced.

Figure 5:
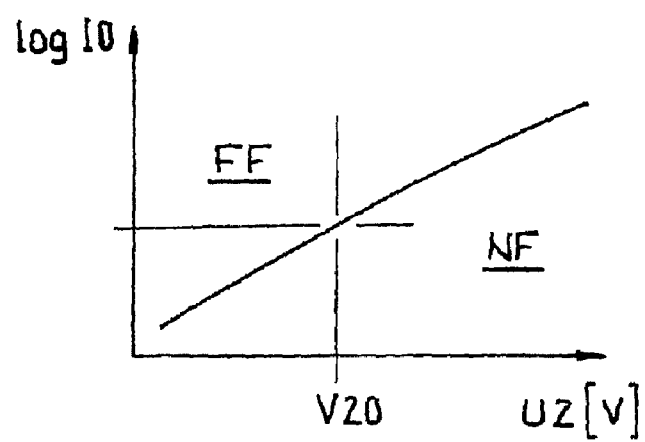
FIG. 5 shows a current-voltage characteristic for the current in the input path of a circuit arrangement according to an embodiment of the present invention.

FIG. 5 shows the current-voltage characteristic for the current I0 measured by the current sensor 31, 32 relative to this voltage U2. In this context, the input current I0 is plotted logarithmically on the ordinates. The characteristic curve of the input current I0 flowing through the two PMOS diodes 32, 33 has a characteristic curve that increases in a largely linear manner with increasing voltage U2 in a logarithmic representation. A voltage value V20 is specified on the abscissa which represents the voltage U2. This voltage value V20, which in the present example is 1.5 V, for instance, separates the far field FF and the near field NF from one another, where U2<V20 defines the far field FF and U2>V20 defines the near field NF. For a voltage of V20=1.5 V, the result is a current value I0=500 pA, for example. In the far field FF, the current is thus I0<500 pA, and in the near field NF the current is I0>500 pA.

On account of the logarithmic representation of the current I0, there thus results a vanishingly small I0 in the far field FF, which is negligibly small, at least in comparison to a detector current provided by the circuit component 14. In the near field NF, in contrast, an ever growing current I0, which increases exponentially with the voltage U2, is provided very quickly, and this current is significantly larger than a detector current provided by the circuit component 14. In a certain sense, the characteristic curve shown in FIG. 5 thus represents a diode characteristic curve. Hence in the far field FF the detector current is provided almost exclusively by the circuit component 14, while in the near field NF, by contrast, the detector current for discharging and thus for reproducing the analog signal voltage U1 is provided primarily by the inventive circuit arrangement 17 for load current regulation or, respectively, its current sinks 36, 39.

From the respective current mirrors 36, 39, a discharge current I1, I2, which mirrors the current I0 and has a characteristic curve approximately similar to that in FIG. 5, is generated as a function of the area ratios of the transistors 34, 35 and 34, 38. Another advantage of the inventive circuit arrangement 17 for load current regulation is that additional circuit blocks, designed for example for the far field and thus for very low power consumption, now have a very much higher current made available to them in the near field. Their functionality and reliability is thus expanded in an advantageous manner. This can be achieved by expanding the circuit arrangement 17 according to the invention, for example by the provision of additional current mirrors (indicated in FIG. 4 with dashed lines).

The voltage value V20, and thus the definition of the areas for the far field FF and the near field NF can be different depending on the application. For example, the maximum range may be used for defining far field and near field. The maximum range is particularly dependent on the receiver sensitivity of the transponder and designates the theoretically possible, maximum range in which a carrier signal and the notches present therein can still be definitely recognized for what they are. Of course, this depends on the transmit power of the transmitter and/or the frequency of the carrier signal. For example, the near field could designate those voltage values that are under 50% the maximum range. In this case, the far field for voltage values would lie in the region over 50% the maximum range.

Figure 6:
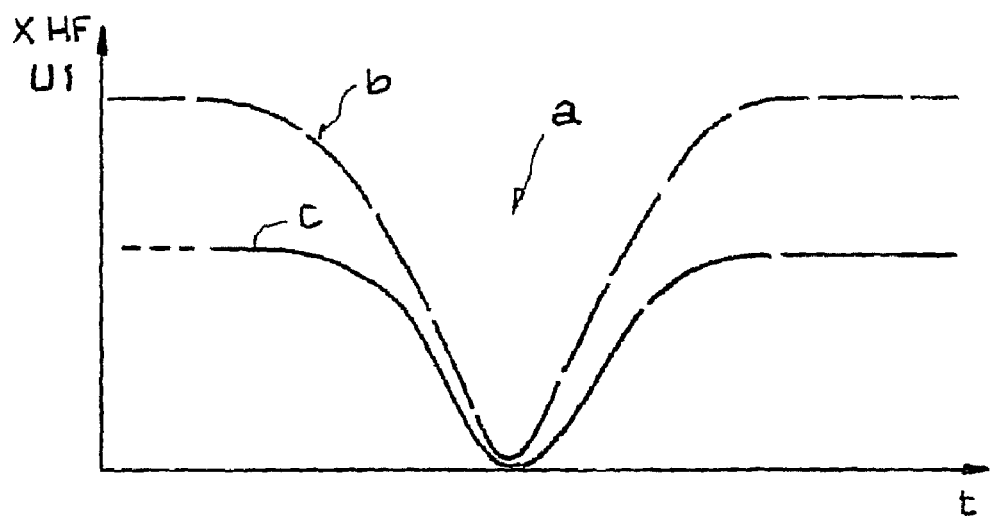
FIG. 6 shows the behavior of the envelope curve of a high frequency electromagnetic carrier signal and the signal voltage derived therefrom in the case of a transponder operated in the near field, according to an example embodiment of the present invention.

FIG. 6 shows the behavior of the envelope curve of a high frequency electromagnetic carrier signal and the signal voltage derived therefrom in the case of a transponder operated in the near field.

By the inventive circuit arrangement 17 for load current regulation, the envelope curve b of the carrier signal XHF can be optimally reproduced with a transponder operated in the near field. This is possible because an additional discharge current I1, I2 is provided in the near field which draws a discharge current from the circuit component 14 or the analysis circuit 16, respectively, and thus very quickly and effectively reproduces the very steep drop or rise in the envelope curve b in the vicinity of a notch a. Moreover, it is also ensured by this means that the signal voltage U1 drops to 0 V—or at least approaches 0 V relatively closely—in the vicinity of a notch a, with the result that a very high probability of recognition of a given notch a, and thus very low bit error rates (BER) are achievable.

The diodes 32, 33, 34 can be embodied either as PN diodes or MOS diodes. In a further embodiment, MOS transistors wired in diode circuits are typically used, since these MOS diodes are less temperature-dependent than PN diodes, and are therefore preferred over PN diodes.

Although the present invention was described above on the basis of a preferred example embodiment, it is not limited thereto, but can rather be modified in many diverse ways.

In particular, the invention is not limited to the circuit versions provided in FIGS. 3 and 4. It is a matter of course that any desired number of additional circuit versions could be specified through suitable variation of the circuit arrangement provided therein without departing from the basic principle of the invention. Moreover, in the case of the transistors in particular, it is possible to specify any desired number of additional circuit versions by replacing the N conductivity type with P and vice versa, as well as by varying the number, type and design of the components. It also goes without saying that, instead of using PN diodes or MOS diodes, their functions could also be realized by other components with rectifying functionality.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A detector circuit for a receive path of a transponder, the detector circuit comprising:
    an input for receiving a signal derived from a high frequency electromagnetic carrier signal;
    a circuit component for detecting and analyzing a signal voltage derived from said received signal, the circuit component including, following said input, a signal capacitor across which the signal voltage which is dependent on the field strength of the carrier signal drops, and an analysis circuit following the signal capacitor for analyzing the signal voltage; and
    a circuit arrangement for load regulation that draws a discharge current from the circuit component in the event that a magnitude of the signal voltage exceeds a predetermined threshold
    wherein, when said signal voltage is greater than said predetermined threshold, said circuit arrangement provides substantially all of a required discharge current for reproducing the signal voltage and when said signal voltage is less than said predetermined threshold substantially all of said required discharge current for reproducing the signal voltage is provided by said circuit component.

2. The detector circuit according to claim 1, wherein the circuit arrangement for load regulation comprises:
    an input path through which a first voltage signal can be tapped;
    a voltage sensor arranged in the input path for measuring the first voltage signal;
    at least one output path through which a discharge current signal can be tapped; and
    at least one controllable auxiliary current source being arranged between the input path and the output path to provide the discharge current signal such that a value of the discharge current signal increases exponentially with increasing voltage of the first voltage signal, a control side of the auxiliary current source being connected to an output of the voltage sensor.

3. The detector circuit according to claim 1, wherein a voltage signal present at an input of the circuit arrangement for load regulation is provided as a measure of the predetermined threshold of the signal voltage.

4. The detector circuit according to claim 1, wherein the circuit arrangement for load regulation is connected to the input of the detector circuit, and wherein the circuit arrangement for load regulation is connected to a tap between the signal capacitor and the analysis circuit and produces a discharge current for discharging the signal capacitor.

5. The detector circuit according to claim 1, wherein the circuit arrangement for load regulation is connected to the input of the detector circuit, and wherein the circuit arrangement for load regulation is connected on an output side of the analysis circuit and produces a discharge current for discharging the analysis circuit.

6. The detector circuit according to claim 1, wherein a first rectifier circuit for rectifying the signal derived from the high frequency electromagnetic carrier signal is provided between the input of the detector circuit and the signal capacitor.

7. The detector circuit according to claim 6, wherein a second rectifier circuit or a multi-stage rectifier is connected ahead of the circuit arrangement for load regulation on an input side.

8. The detector circuit according to claim 7, wherein the second rectifier circuit has a higher time constant than the first rectifier circuit, which is an RSSI amplifier that contains the signal capacitor.

9. The detector circuit according to claim 1, wherein the circuit component further includes an a received signal strength indicator (RSSI) amplifier that contains the signal capacitor.

10. The detector circuit according to claim 1, wherein the transponder is a passive and/or semi-passive transponder.

11. A transponder comprising:

an antenna for receiving a high frequency electromagnetic carrier signal for supplying energy to the transponder and for data communication with at least a transmitting station, the antenna being arranged between a first and second input of the transponder; and a receive path following the antenna in which a demodulator circuit is arranged for demodulating a received modulated signal that is derived from the high frequency electromagnetic carrier signal, wherein the demodulator circuit has a detector circuit comprising:

an input for receiving a signal derived from the high frequency electromagnetic carrier signal;

a circuit component for detecting and analyzing a signal voltage, the circuit component including, following said input, a signal capacitor across which a signal voltage dependent on the field strength of the high frequency electromagnetic carrier signal drops, and an analysis circuit following the signal capacitor for analyzing the signal voltage; and a circuit arrangement for load regulation that draws a discharge current from the circuit component in the event that a magnitude of the signal voltage exceeds a predetermined threshold.

12. The transponder according to claim 11, wherein the antenna is a dipole antenna for receiving and sending the high frequency electromagnetic carrier signal.

13. The transponder according claim 11, wherein a receiver is provided that is designed to receive the high frequency electromagnetic carrier signal, which has a frequency in the range 100 MHz to 4.5 GHz.

14. The transponder according to claim 11, wherein the transponder is a passive and/or semi-passive transponder.

15. The transponder according to claim 11, wherein, when said signal voltage is greater than said predetermined threshold, said circuit arrangement provides substantially all of a required discharge current for reproducing the signal voltage and when said signal voltage is less than said predetermined threshold substantially all of said required discharge current for reproducing the signal voltage is provided by said circuit component.

* * * * *